Figure 1:
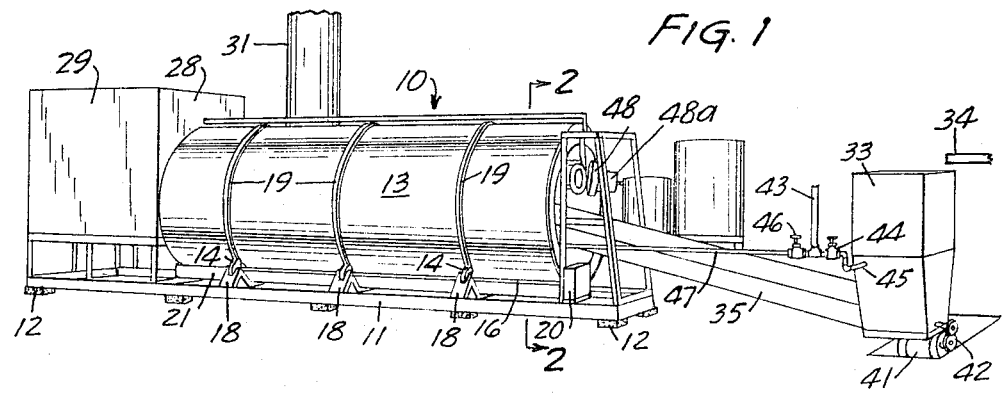

Aug. 30, 1966 A. OSTRIN ETAL 3,269,341
INCINERATOR FOR LIQUID AND SOLID SCRAP
Filed Feb. 13, 1964 2 Sheets-Sheet 1

INVENTORS
ALBERT OSTRIN
MYRON S. BERMAN
BY Williamson & Palmatier
ATTORNEYS

Aug. 30, 1966        A. OSTRIN ETAL        3,269,341
                INCINERATOR FOR LIQUID AND SOLID SCRAP
Filed Feb. 13, 1964                        2 Sheets-Sheet 2
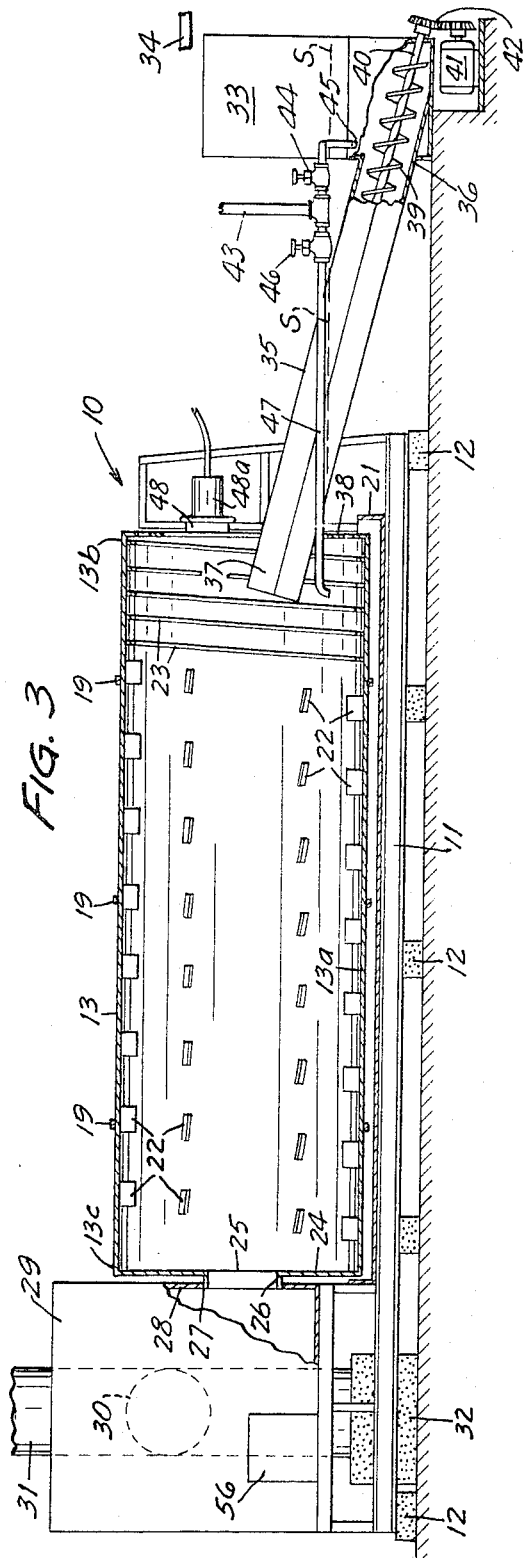
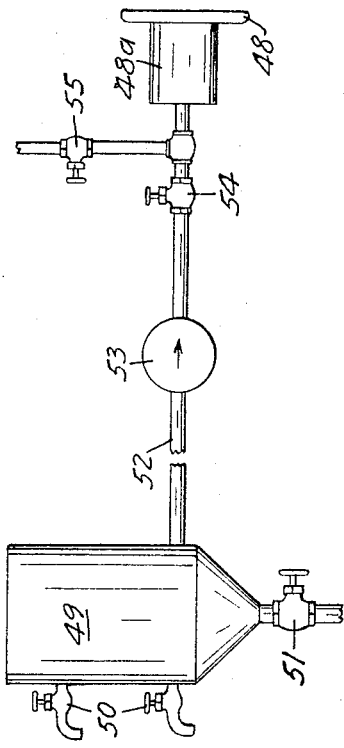
INVENTORS
ALBERT OSTRIN
MYRON S. BERMAN
BY Williamson & Palmatier
ATTORNEYS 3,269,341
INCINERATOR FOR LIQUID AND SOLID SCRAP
Albert Ostrin, Minneapolis, and Myron S. Berman, St. Paul, Minn., assignors to Commercial Chemical Co., Inc., Newport, Minn., a corporation of Minnesota
Filed Feb. 13, 1964, Ser. No. 344,698
5 Claims. (Cl. 110—14)

This invention relates to an incinerator for disposing of scrap containing a large proportion of highly volatile liquids.

An object of our invention is to provide a new and improved apparatus of simple and inexpensive construction and operation for burning industrial scrap which may include a large proportion of highly combustible liquids, solid combustibles, non-combustibles, and water. Such combustibles including the usual janitor-collected refuse, containers of metal and paper, general factory waste such as lunch boxes, rags, etc., and the highly combustible liquids may include various kinds of solvents and other surplusage from industrial processing such as methanol, still bottoms, sludges from trichloroethylene, varnish, glue, cutting oils, and the like, all of which may be thrown together in drums or tanks and mixed indiscriminately.

Another object of our invention is the provision in an incinerator for burning industrial scrap of a novel apparatus for safely and efficiently handling and supplying to the incinerator such scrap which may contain a wide variety of types of materials including highly combustible and non-combustible liquids varying widely in viscosity, various forms of solids, stringy and other non-liquid materials.

Figure 2:
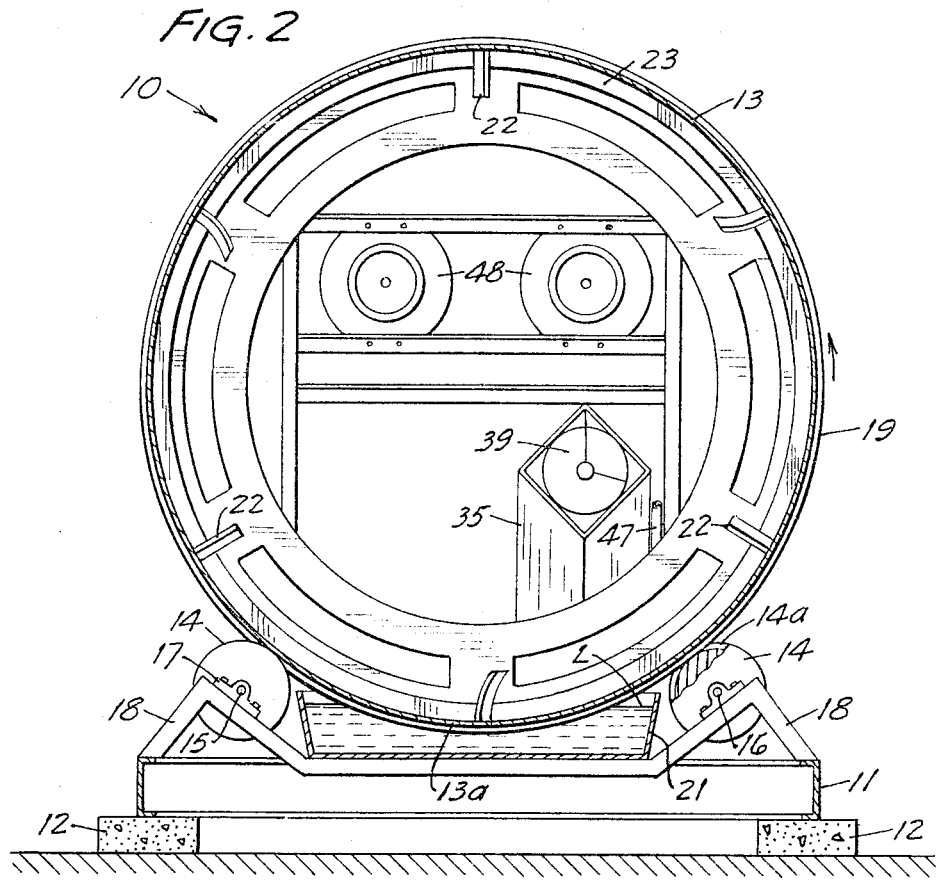

These and other objects and advantages of our invention will more fully appear from the following description made in connection with the accompanying drawings, wherein like reference characters refer to the same or similar parts throughout the several views, and in which:

FIG. 1 is a perspective view of the apparatus;

FIG. 2 which is a cross section view taken approximately at 2—2 in FIG. 1 and FIG. 3 is a longitudinal section view with certain background parts broken away and shown in section for clarity of detail;

FIG. 4 is a diagrammatic sketch illustrating the supply for the burners of the incinerator.

One form of the invention is shown in the drawings and is described herein.

The incinerator is indicated in general by numeral 10 and includes a frame 11 which may be constructed of structural steel carried on suitable concrete footings 12 and firmly implaced into the ground.

The incinerator 10 also includes a large elongate rotary drum 13 constructed of sheet steel and supported in a horizontal position with the axis of the cylinder drum 13 extending horizontally and the bottom side 13a thereof lying horizontally in a longitudinal direction to minimize flow of liquids along the drum 13 under influence of gravity. The drum 13 is supported from frame 11 by a plurality of wheels or rollers 14 which are mounted on shafts 15 and 16. The shafts 15 and 16 are carried in bearings 17 which are affixed on rigid brackets 18 affixed as by welding to the main frame 11. The rollers or wheels 14 may be provided with guide flanges 14a extending around their peripheries, and the rollers 14 engage rigid steel bars or tracks 19 which are affixed on the outer periphery of drum 13 as by welding which extend peripherally there around.

Shaft 16 has the rollers 14 keyed or splined thereto so as to obtain and maintain a continued driving relation between the shaft and rollers. The shaft 16 is driven by motor 20 through a step down gear mechanism which when revolved effects slow rotation of the drum 13.

An elongate receptacle or trough 21 having an open top is also carried upon the frame 11 and contains a quantity of liquid to the level L indicated in FIG. 2, and it will be noted that the bottom side of 13a of the drum is immersed in the liquid, preferably water in the trough.

The drum 13 is provided with a plurality of vanes 22 and 23 projecting inwardly from the inner periphery thereof. The vanes 22 are each relatively short and are affixed to the drum 13 as by welding, and the vanes 22 are oriented obliquely with respect to the rotation axis of the drum so as to engage scrap as the drum revolves and urges the scrap longitudinally along the drum from the ingress end 13b to the egress end 13c of the drum. It will be noted that the vanes 22 are disposed all along the length of the drum interior with the exception of the area closely adjacent the ingress end 13b, at which location the vane 23 is mounted.

Vane 23 comprises a single elongate helicoidal vane extending continuously around the inner periphery of the drum through a plurality of convolutions. The helicoidal vane 23 is arranged in the drum in accordance with the direction of rotation as to move or to propel scrap material longitudinally along the drum and away from the ingress end 13b thereof.

At the egress end 13c of the drum an annular closure plate 24 at least partially obstructs movement of materials forwardly through the egress end. The plate 24 has an enlarged central opening 25 through which combustion gases including smoke, air and water vapor pass and also through which unburned non-combustion products also pass. A short endwise protruding ring 26 is attached to the plate 24 around the periphery of opening 25 therein and is disposed in open communication with an opening 27 in the sidewall 28 of a stack housing 29, also supported on the frame 11. The stack housing has a discharge opening 30 connected to a combustion gases discharging stack 31 which may be of suitable height as to provide necessary draft. The stack 31 is, in the form shown, disposed in spaced relation with the stack housing 29 and is supported on its own footing 32.

Means are provided for supplying waste and scraps into the incinerator and in the form shown, such means include a supply hopper 33 having an open top and disposed adjacent a suitable loading platform 34 from which containers of material may be emptied into the hopper 33. Such materials may include many of the industrial wastes or scraps as here and before indicated and many of which may be mixed together in a conglomeration of a thick or relatively viscous nature. Preferably the hopper 33 is supplied substantially continuously with such materials so as to maintain the hopper partially full, thereby assuring a substantially continuous supply of materials for handling in the incinerator.

Means are provided for conveying the scraps or waste materials from the hopper 33 into the drum 13. Such means include a conduit 35 having a receiving end 36 in open communication with the bottom of hopper 33. The discharging end 37 of the conduit projects into the ingress end 13b of the drum, at a position radially inwardly of the annular end plate 38 of drum 13. In the form shown the conduit 35 has a square or rectangular shape, both could as well have a substantially cylindrical shape. A screw auger or helicoid 38 and 39 extends through the conduit 35 and is rotatable therein. The screw auger 39 extends into the bottom of hopper 33 for carrying materials therefrom into the conduit 35 and upwardly along the conduit and into the drum 13. The shaft 40 of the screw auger 39 extends through the bottom of hopper 33 and through a suitable sealing bushing to be driven from a motor 41 through a gear mechanism 42 which interconnects the shaft with the motor.

It will be noted that the conduit 35 and the screw auger 39 are inclined upwardly from hopper 33 to the discharge end 37 of the conduit. A quantity of liquid is continuously maintained in the conduit 35 adjacent the louver end 36 thereof to continuously entirely fill the receiving end 36 of the conduit. The liquid is maintained approximately at the level indicated at S so as to provide a gas seal preventing any movement of gases between the interior of conduit 35 and the hopper 33, thereby preventing combustion flashbacks into and through the hopper. Correspondingly the level of liquid in the hopper 33 is also maintained continuously at a level S.

Means are provided for continuously maintaining the level of liquid at S, and in the form shown a supply pipe 43 which is connected to a suitable source of water is connected through a valve 44 and to a discharge end 45 which discharges into the hopper 34.

The source of water supplied through pipe 43 is also connected through a valve 46 and pipe 47 to continuously direct a stream of water into the drum 13 at the vanes 23 adjacent the ingress end 13b and so show that a substantial supply of water is directed onto the bottom side 13a of the drum at all times.

The incinerator 10 is also provided with a pair of high pressure burners 48 at the open ingress end of the drum. The burners 48 may be of any suitable type, but are preferably adjusted for burning liquid combustibles and such certain industrial scrap which may be relatively easily segregated as by gravity. The burners 48 are of a common variety and are provided with pump-motor units 48a as are common.

In FIG. 4 is a settling tank 49 into which liquid combustibles may be poured with bleed off valves 50 connected thereto for draining liquids of certain undesirable natures which would not burn easily at the burners 48. The tank may also be provided with a sludge discharging valve 51 at its bottom. The collecting and settling tank 49 is connected by a conduit 52 to pump 53 from which the combustible liquids may be directed through a valve 54 to the burners 48. In the event that suitable liquid combustibles are not available, the burners 48 may be supplied with conventional fuel oil through a valve 55.

In the use and operation of the incinerator 10 the drum 13 is revolved slowly by the supporting and driving rollers so as to continuously pass portions of the drum through the cooling bath in trough 21. The burners 48 direct flames into the ingress end 13b of the drum and the materials to be incinerated are supplied into the drum from the screw auger 39 and conduit 37. It will be understood that the temperatures in the drum 13 are sufficient as to ignite volatilized liquids being cammed by the screw auger 39. Except for the continuous liquid seal maintained by the level of liquid indicated at S in the receiving end of the conduit 35 and in the hopper, there could well be flashback into and through the hopper, thereby endangering personnel working on the loading platform 44.

As the scrap material is discharged from conduit 37, it drops downwardly into the helicoidal vane 23. Likewise, the stream of water from pipe 47 is directed downwardly to the bottom side 13a of the drum at the helicoidal vanes 23.

As the drum 13 revolves relative movement between the scrap and the drum together with the vanes 23 is effected. The water supplied from pipe 47 effects a dispersal of the scrap as soon as the scrap materials are moved inwardly by helicoidal vane 23 into the central portion of the rotating drum 13 as dispersal of the waste and scrap materials including liquid combustibles is effected by the movement of the vanes and by action of the water supplied, these combustible scraps are readily burned. It will be understood that some of the scraps, and especially the highly volatile liquids, are ignited almost immediately upon entering the drum 13 by the flames directed endwise inwardly from burners 48. The water supplied into the drum 13, together with a portion of the scrap material is carried upwardly, at least slightly, by the segmental valves 22 as the drum is rotated so as to also provide a cooling effect on the drum in cooperation with the cooling effect on the drum in cooperation with the cooling effect provided by the trough 21.

It should be noted that the vanes 22, which are all angularly oriented with respect to rotation axis of drum 13, but which may individually have slightly varying shapes, continuously propel the material in the drum 13 endwise along the bottom toward the egress end 13c thereof. It has been found as a practical matter that there is practically no materials carried entirely to the egress end 13c, with exception of certain exceedingly fire resistant materials such as steel. Even the conventional tin cans, when subjected to the heat of the incinerator for an extended period will essentially disintegrate. The completely uncombustible materials are carried forwardly along the drum and are ultimately directed outwardly into the stack housing 29 to which access may be had through a cleanout door 56 or other convenient cleanout means.

It will, of course, be understood that various changes may be made in the form, details, arrangement and proportions of the various parts without departing from the scope of our invention.

We claim:

1. An incinerator for scrap containing a substantial portion of combustible liquids,
    comprising a frame,
    an elongate rotary burning drum lying on its side and having combustion gases ingress and egress ends,
    means on the frame and mounting said drum for rotary movement and producing rotation of said drum,
    vane means affixed within the drum and protruding inwardly from the inner periphery of the drum, said vane means controlling and producing movement of the scrap along the drum under the influence of rotation of the drum,
    stack means in gaseous communication with the egress end of the drum and discharging combustion gases,
    scrap supplying means adjacent the ingress end of the drum and including a hopper receiving and temporarily storing a quantity of the scrap, said hopper having a bottom,
    said supplying means also including a conduit having a scrap receiving end communicating with the bottom of the hopper, said conduit also having a discharging end elevated entirely above the scrap receiving end and said discharging end extending into liquid communicating relation with the drum interior adjacent said ingress end of the drum,
    the hopper and discharging end of the conduit cooperating when liquid is introduced into the receiving end of the conduit, to confine the liquid in and entirely fill said receiving end to prevent gaseous communication, through the conduit to the hopper and thereby preventing flashback into and through the hopper,
    and said supplying means also including a conveyor in the conduit and carrying the scrap along the conduit and outwardly of the discharge end thereof and into the drum,
    and a burner on the frame at the ingress end of the drum and directing a flame into the drum, thereby producing and maintaining combustion in the drum of the scrap supplied thereto.

2. The incinerator according to claim 1 and including means continuously maintaining the receiving end of said conduit in filled condition, and including a source of water.

3. An incinerator for scrap which may include a substantial portion of combustible liquid,
    comprising a frame,
    an elongate rotary burning drum oriented in generally horizontal position and having a longitudinal axis extending substantially horizontally said drum having a bottom side lying horizontally to minimize gravity induced flow of liquid therealong, said drum also having combustible gases ingress and egress ends, means on the frame and mounting said drum for rotary movement and producing rotation of the drum with said bottom side thereof being retained in horizontal position, discontinuous vane means affixed within the drum and protruding inwardly from the inner periphery of the drum, said vane means lying obliquely of the rotation axis and producing movement of the scrap along the drum toward the egress end thereof and under influence of rotation of the drum, stack means in gaseous communication with the egress end of the drum and discharging combustion gases, scrap supplying means adjacent the ingress end of the drum and including a hopper receiving and temporarily storing a quantity of the scrap, said hopper having a bottom, said supplying means also including an inclined conduit having a lower scrap receiving end communicating with the bottom of the hopper, said conduit also having an upper discharging end in liquid communicating relation with the drum interior adjacent the ingress end of the drum, said discharging end being elevated entirely above said receiving end, said discharging end and hopper cooperating when liquid is introduced into the receiving end of the conduit, to confine the liquid and entirely fill the receiving end of the conduit and prevent communication through the conduit and to hopper and thereby preventing flashback into and through the hopper, and said supplying means also including a conveyor in the conduit and carrying the scrap along the conduit and outwardly of the discharge end thereof and into the drum, means supplying water into the drum through the ingress end thereof and onto the bottom side of the drum, the water moving on the bottom side of the drum under influence of the rotation of the drum and movement of the vanes to effect dispersing of the combustible scraps and produces efficient burning thereof and to cool the drum interior, and a burner on the frame at the ingress end of the drum and directing a flame into the drum, thereby producing and maintaining combustion in the drum of the scrap supplied thereto.

4. An incinerator for scrap containing a substantial portion of combustible liquid, comprising a frame, an elongate rotary burning drum lying on its side and having a substantially horizontal longitudinal axis, said drum having combustion gases at ingress and egress ends, said drum having a substantially horizontal bottom side to minimize movement of liquid therealong under influence of gravity, means on the frame and mounting said drum for rotary movement and producing rotation of the drum, vane means affixed within the drum and protruding inwardly from the inner periphery of the drum, said vane means including an elongate helicoidal vane adjacent the ingress end of the drum and extending continuously of the periphery of the drum and in accordance with the rotation of the drum to produce movement of the scrape along the drum, said vane means also including additional vane segments spaced from said helicoidal vane along the drum and also spaced from each other along the drum and around the inner periphery thereof, and said vane segments being oriented obliquely of the rotation axis to produce movement of the scrape along the drum under influence of rotation of the drum, stack means in gaseous communication with the egress end of the drum and discharging combustion gases, scrap supplying means adjacent the ingress end of the drum and including means conveying scrap of mixed liquid and solid nature, and a burner on the frame at the ingress end of the drum and directing a flame into the drum, thereby producing and maintaining combustion in the drum of the scraps supplied thereto.

5. The incinerator according to claim 4 and including means direcing a stream of water into the drum through the ingress end thereof and onto the said helicoidal vane for producing movement of scrap along the vane under influence of rotating of the drum and also dispersing the scrap producing efficient burning thereof and cooling the drum.

References Cited by the Examiner

UNITED STATES PATENTS

| 366,956 | 7/1887 | Hogan. |
| 1,833,386 | 11/1931 | Waern. |
| 1,835,147 | 12/1931 | Drew _____ 110—14 |
| 2,373,749 | 4/1945 | Elkington et al. ____ 263—33 X |
| 2,925,821 | 2/1960 | MacDonald _____ 110—14 X |

FREDERICK L. MATTESON, JR., *Primary Examiner.*

JOHN J. CAMBY, *Examiner.*